(12) United States Patent
Dowler et al.

(10) Patent No.: US 11,404,905 B2
(45) Date of Patent: Aug. 2, 2022

(54) SELF CONFIGURING MODULAR ELECTRICAL SYSTEM

(71) Applicants: David Eugene Dowler, Santa Maria, CA (US); Edmund David Burke, Santa Maria, CA (US); Martin Stewart Waldman, Santa Maria, CA (US)

(72) Inventors: David Eugene Dowler, Santa Maria, CA (US); Edmund David Burke, Santa Maria, CA (US); Martin Stewart Waldman, Santa Maria, CA (US)

(73) Assignee: Space Information Laboratories, LLC, Santa Maria, CA (US)

( * ) Notice: Subject to any disclaimer, the term of this patent is extended or adjusted under 35 U.S.C. 154(b) by 2211 days.

(21) Appl. No.: 14/162,650

(22) Filed: Jan. 23, 2014

(65) Prior Publication Data

US 2021/0313830 A1  Oct. 7, 2021

Related U.S. Application Data

(60) Provisional application No. 61/849,739, filed on Feb. 1, 2013, provisional application No. 61/849,740, filed on Feb. 1, 2013.

(51) Int. Cl.
*H02J 9/06* (2006.01)
*H02J 7/00* (2006.01)

(52) U.S. Cl.
CPC .............. *H02J 9/068* (2020.01); *H02J 7/005* (2020.01); *H02J 7/0016* (2013.01); *H02J 7/0024* (2013.01); *H02J 9/061* (2013.01)

(58) Field of Classification Search
CPC .......... H02J 9/068; H02J 9/061; H02J 7/0016; H02J 7/0024; H02J 7/005; H02J 1/102; H02J 7/00; H01M 10/48
See application file for complete search history.

(56) References Cited

U.S. PATENT DOCUMENTS

| | | | | |
|---|---|---|---|---|
| 5,534,366 A | * | 7/1996 | Hwang | H02J 7/0034 429/91 |
| 6,043,629 A | * | 3/2000 | Ashley | H02J 1/102 320/119 |

(Continued)

*Primary Examiner* — Lincoln D Donovan
*Assistant Examiner* — Alex W Lam

(57) ABSTRACT

This matrix-like power/communications system is a decentralized array of scalable self-configuring modular electrical components that are easily physically and electrically replaceable and combinable into any series, parallel or bypassed state with any power supply and bi-directional data communications input; resulting in an autonomous system survivable in the harshest environments including physical shock, vibration, vacuum, radiation, thermal, and electromagnetic interference; and provides a communication interface for external control or monitoring, simultaneously being capable of reconfiguring itself if an internal battery cell failure occurs by switching in a spare cell(s) to replace a dead cell within the system for maintaining uninterrupted power and communications during the upset event, while being capable of reconfiguring itself autonomously into an arrangement of series/parallel states for charge/discharge while enabling cell balancing and continual monitoring of all individual cell parameters, and only using two wires for all component interconnection.

7 Claims, 4 Drawing Sheets

(56) References Cited

U.S. PATENT DOCUMENTS 7,304,453 B2 * 12/2007 Eaves .................. G01T 1/249
                                                320/120
2006/0217914 A1 * 9/2006 Bertness ............... G01R 31/36
                                                702/113

* cited by examiner

SELF CONFIGURING MODULAR ELECTRICAL SYSTEM

This application is the formal patent submission based upon two Provisional Patents, the first one No. 61/849,739 titled: "Distributed Integrated Power and Communication System" and No. 61/849,740 "Spare Cell Integrated Battery", both issued on 1 Feb. 2013.

BACKGROUND

Prior Art

The following is a tabulation of prior art that presently appears relevant:

| Pat. No. | Kind Code | Issue Date | Patentee |
|---|---|---|---|
| 5,534,366 | B1 | 1996 Jul. 9 | Hwang et. Al. |
| 6,043,629 | B1 | 2003 Mar. 28 | Ashley et. Al. |
| 7,304,453 | B2 | 2007 Dec. 4 | Eaves et. Al |

Although existing power systems are capable of simultaneously carrying data and providing power over the same electrical lines while also being capable of autonomously and instantaneously re-configuring themselves to dynamically meet changing mission needs or internal failures, they all rely upon complex switching matrices involving complex chassis structures and wiring harnesses due to their centralized control and monitoring architecture which does not have a simplified way to monitor each individual cell locally with a controller/cell co-located design. As such, these systems could never be adapted to an aerospace application where size, weight and complexity needs to be minimized while at the same time being capable of surviving a harsh earth, launch or orbital environment due to their cumbersome nature which doesn't allow for efficient/lightweight packaging for use in these environments. While some of these present electrical systems can provide some real-time health status feedback and protection, they fall short in performance if an internal battery cell or communications pathway fails, leaving the system unable to efficiently compensate for the resultant loss of power or communications capability.

To the best of our knowledge, there is no existing prior art regarding a self configuring modular electrical system as described therein by this patent which stresses the important aspects of an efficient distributed architecture whereby wiring between all components is reduced to simply two wires between all modules, these wires being a positive and negative wire and are also capable of carrying a radio frequency (RF) signal. However, there are a limited number of inventions addressing modular battery packs and modular control electronics for batteries. A modular battery pack invention by Hwang et al. only concerns itself with physical battery mounting interfaces for easy modular replacement, and does not discuss provisioning for carrying data over its same power lines, nor does it discuss any automated method of internal reconfiguration, and by nature would not utilize one a simple two wire system for all interconnects. The modular control electronics for batteries invented by Ashley et al. only addresses the modular control methods for charging each battery cell to protect the batteries and optimize their performance. Here again, Ashley does not discuss anything that resembles his control electronics wiring simultaneously carrying data, nor is it capable of automatically reconfiguring itself with a simple architecture if an upset occurs. Eaves et al. describes an arrangement of two or more cells mounted to a card, with the card or cards then being integrated within an enclosure. With Eaves's arrangement as intended and designed, it is not possible to create a system that delivers communications and power simultaneously over the same lines, nor is it possible for it to automatically reconfigure itself internally, especially with only two wires connecting between his components, in addition, it and all the others are not of a design/architecture nature whereby they can possibly meet stringent aerospace design criteria of minimal size/weight and also be robust enough to survive the operational requirements and rigors of a harsh earth, space launch or orbital environment. Finally, the inventions of Hwang, Ashley and Eaves are integrated systems whereby all their components are physically co-located, in complete contrast to this invention where components of the system can be distributed in any number of remote locations on a vehicle with local control being resident at each module's location on an individual cell basis, for instance one component can be in the nose of an airplane, another component in a wing and another in the tail, or in the case of an automobile, components can be in the trunk, within the engine or in a door, or any other place on the vehicle. Due to the complex, rigid and single-minded nature of these prior inventions, none of them can be adapted to the intent and demands that are required by this invention for the following reasons:

(a) Existing battery/power systems no matter how advanced, are not capable of autonomously reconfiguring their internal series/parallel arrangement in an efficient manner with individual cell-level control to meet evolving mission needs, nor adapt to an internal battery cell failure.

(b) The manufacture of all present battery systems presently dictates that they are limited in expandability and reconfigurability due to common manufacturing processes that are rigid and without modification unless sufficient funding is available, however even then, they can't match the ease of flexibility as demonstrated by this invention.

(c) No efficient capability exists to automatically protect and reconfigure any present battery on a cell level from the results of a short circuit, under voltage or over charge situation.

(d) Existing battery systems are stand-alone and cannot receive configuration or control input internally on an individual cell basis or simultaneously from an external source, thus limiting it from being interactive with other power systems in a 'plug and play' manner or in a network of distributed components.

(e) There is no possible way to configure any existing battery cells in a distributed modular way whereby their internal workings are survivable and sustainable in a conventional failure scenario.

(f) There is no ruggedized or simple 2 wire battery system existing which can autonomously reconfigure itself into a new series or parallel configuration depending on charge/discharge requirements, and also instantly connect to an available spare cell to replace a cell gone bad, while at the same time be fragmented into any number of individual components for mounting in various locations to increase survivability while decreasing overall weight.

(g) Present battery issues include the cost of operating and maintaining them over extended periods of time, especially when it comes to having insight into the properties of each and every cell and their present state of arrangement with each other, whether in series or parallel, and their ability to reconfigure themselves if there is a problem detected, which if unresolved can terminate the operation of the entire battery.

(h) A centrally controlled battery system cannot function as efficiently at full capacity as a distributed system can if a single cell fails internally.

(i) All present battery systems due to their complex nature require a compromise when it comes to mounting space and weight especially when redundancy is required and a whole additional battery usually is required to be co-located just in case it's needed if the primary one ceases operation for any reason.

(j) Existing batteries utilizing standard centralized electronics require special thermal design considerations that would not be possible given the complex requirement for autonomous internal reconfiguring which would also require that a spare cell is ready and functional to be operationally switched into use at a moments notice to continue a mission without interruption.

(k) Present battery power systems preclude the ability to rapidly and efficiently integrate an external power source to augment existing power processing parameters.

(l) Existing battery systems cannot be commanded on an individual cell basis via internal or external software into a new state, and leaves a user helpless if mission requirements change spur of the moment, or if a presently available battery has an internal cell failure.

(m) There is no efficient method with a decentralized control system for gathering live data from an individual cell within a group of cells that comprise a battery, whether arranged in series or parallel.

(n) Existing battery/power systems in either a pre-arranged series or parallel configuration are held to that configuration when predictive analysis is attempted, limiting the operational scenarios to only that one configuration.

(o) Unfortunately the battery systems of today are mostly comprised of obsolete matrix-like wiring technology and is not nearly as efficient as it could be based upon components available in the marketplace, thereby allowing for a complete battery failure if a single cell within an existing battery fails.

(p) No system exists which is able to provide cell-level individualized locally controlled live feedback or monitoring of the voltage or temperature of individual battery cells that can internally and autonomously reconfigure themselves from series to parallel arrangements.

(q) Typical existing aerospace battery and power systems require extensive and excessive testing prior to use to insure as greatly as possible that the system will work when it is expected to.

(r) Existing battery/power systems can only provide rudimentary centralized-based monitoring and cannot provide information on internal configuration states in addition to health monitoring to assist in detecting a cell which may be going bad which could bring down the operation of the entire battery.

(s) The ability to rapidly balance and condition a cell which can be autonomously reconfigured on an individual cell basis is not easily accomplished with any prior art inventions or anywhere existing in the battery or power industry.

SUMMARY

The above-described shortcomings clearly illustrate the limited nature of all existing battery/power supply systems that absolutely fall short in being truly robust in capability mainly due to their matrix-like switching and wiring which is not practical for manufacture while also lacking the absolutely highest degree of safety and reliability possible. In aerospace applications where size and weight coupled with ultimate reliability are of critical importance, especially where the cost to orbit a satellite approaches $20,000 per pound and an order of magnitude higher if conducted on a dedicated launch vehicle, one can readily see why the smallest most capable and power dense decentralized control solution is of paramount importance.

Advantages

Accordingly and in sharp contrast to all existing battery/power systems conceived of to date, this invention exemplifies the virtues of being extremely reliable, power dense and flexible in the world. It is clear that the immediate savings and reliability a user would achieve with integrating this system over all other systems would result in new and previously un-realized secondary advantages by simplifying other external interfacing architectures which were previously required to interact and communicate with a standard battery/power system employment. The bottom-line essence of this invention however is that with every pound ultimately saved from its two-wire interconnect architecture along with individual control on a cell basis, that weight savings is immediately converted into saleable size and weight for accommodating additional payload size/weight to sell which was previously unavailable.

In addition to these clear important advantages of its initial architecture approach that substantiates operability, safety, reliability and cost considerations, the following advantages are of paramount importance:

(a) With this invention, even if an individual battery cell fails in flight, the entire system will simply and elegantly autonomously reconfigure itself via local on-board cell control in whatever series/parallel arrangement is required to seamlessly continue the mission without any loss of voltage or current, while at the same time sending all failure mode information to a central data collection location for follow-on troubleshooting.

(b) The readily available modular components of this invention allow for instant sizing to meet practically any requirement in hardware, firmware and software while maintaining the internal capabilities of autonomous serial or parallel reconfiguration for discharge/charge.

(c) The object of this invention is to preclude all possible risk within the battery/power system by protecting it from the deadly circumstances of a short circuit, under voltage drain or over charge situation, regardless of whether the system has configured itself internally in a series or parallel state.

(d) For enhanced distributed operations, this invention can be fractionated and have its components sub-divided into smaller pieces for physical mounting considerations wherever necessary.

(e) The autonomous internal configuration capability of this invention allows for a robust scalable system with any number of modular components combinable into an array-like structure not only in hardware, but also in software and firmware.

(f) The internal autonomous controlling electronics is equally as survivable as the battery cells themselves in any application on the ground, and throughout a missile or rocket launch scenario, including hazards of orbital exposure.

(g) Regardless of how this invention configures itself in accordance with mission requirements, it still provides internal visibility down to the cell level while associating itself with any array of external power systems and at the same time being practically maintenance free.

(h) This invention has the capability to autonomously and elegantly reconfigure itself internally to maintain a full and uninterrupted output level of voltage and current by employing a 'spare tire' concept battery cell or cells that instantly replaces any one failed cell, and all with just a two wire system.

(i) With the internal redundancy made possible with this invention, the smallest size and weight required for achieving the greatest amount of power within the smallest amount of space possible is now possible, allowing for the size/weight savings to be sold by the customer to generate additional income.

(j) If internal heaters are necessary to keep all battery cells and modules operational in a harshly cold environment, the distributed and power dense nature of this system allows for heating in a very efficient manner.

(k) The open architecture of this system easily accommodates a compatible interface with an external power source such as a solar panel or fuel cell to assist in charging the integrated battery system as required.

(l) A primary object and advantage of this invention is that it can simply and elegantly reconfigure itself to instantly recover from an internal cell failure such as a short circuit while maintaining the required output voltage and current by autonomously switching in a spare cell much like a 'spare tire' on a car replaces a tire gone bad.

(m) A new precedence will be set with this system whereby battery cell data parameters will be collected in real-time, and regardless if the battery is configured in series or parallel, allowing for a proactive determination if a certain battery cell lot could be susceptible to untimely failure.

(n) Existing data banks of battery performance information are leveraged into the software that comprises the autonomous control of the internal series/parallel configuration to insure that battery cell life is extended as much as possible, and in turn used to generate new predictive modeling for further developing the autonomous software to keep it as optimized and cutting-edge as possible.

(o) Unprecedented reliability is now possible for all ground and aerospace vehicles while maintaining the smallest size footprint possible that utilizes an internal backup battery cell to immensely increase reliability which normally would require a complete parallel backup battery to function alongside the primary battery waiting to take over in the event that the primary battery failed.

(p) The top-level command structure that provides for the internal autonomous reconfiguration capability of the battery cell series/parallel arrangement is suited for direct interface to the controlling and monitoring software on a cell module basis or on a system basis.

(q) The smart control system inherent within the battery control electronics of this invention completely minimizes the amount of pre-flight testing necessary when compared to existing battery/power systems, and additionally minimizes the amount of environmental concerns due to the vibration and shock immunity of the integrated system.

(r) The ability of this invention to autonomously, efficiently and elegantly reconfigure itself internally relieves most of the confusing effort that is presently encountered with existing centralized monitoring systems, additionally the predictive nature of the series/parallel circuitry enables the functionality to focus on what is only important in the real-time employment scenario.

(s) The inherent elegance and simplicity of this invention allows for instant access to the capability of conditioning and balancing any configuration of cells regardless of how they are presently autonomously configured internally, and is enhanced with the ability to autonomously reconfigure itself into a parallel configuration for charging, and a series configuration for discharging.

DRAWINGS

FIG. 1 is an overall system block diagram illustrating the major components comprising the Self Configuring Modular Electrical System (SCMES) to illustrate the simplicity and elegance of this system over all other systems which would require a huge matrix wiring and switching architecture controlled from a centralized location to accomplish what this system does with three individualized modular components which are only connected via two wires (+/−) each, these components being the Communications/Power Interface Module (CPIM), Power Module (PM, repeatable 2-n), System Termination Module (STM) and associated connection wiring.

REFERENCE NUMERALS IN DRAWINGS

Figure 1:
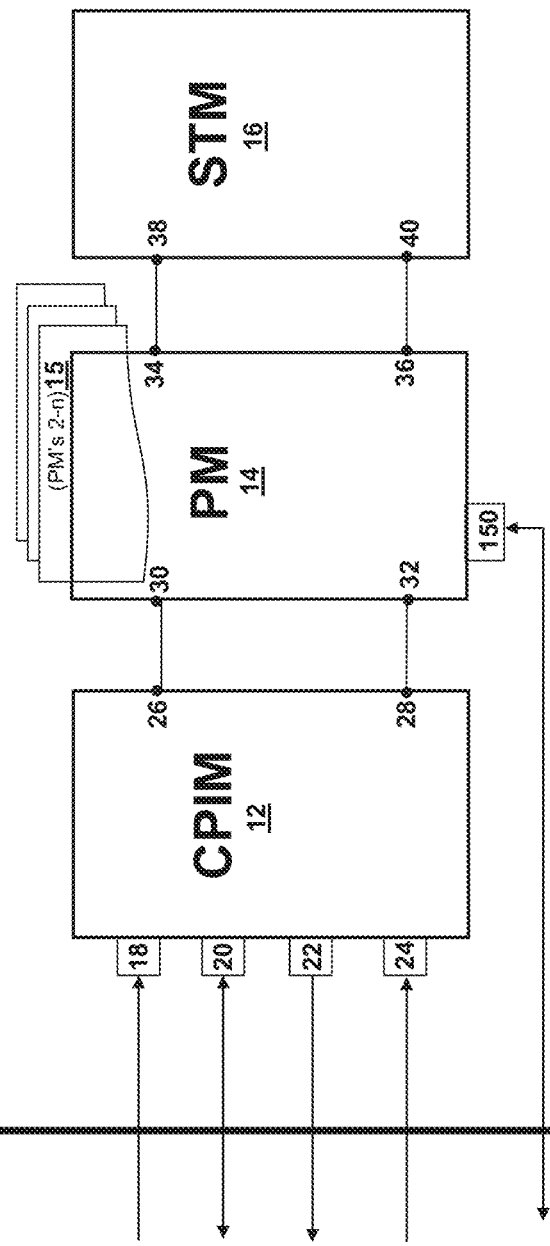

10 SCMES
12 CPIM
14 PM
15 PM's 2-n
16 STM
18 power-in connector
20 bi-directional communications connector
22 output power connector
24 cascade input connector
26 CPIM terminal 1
28 CPIM terminal 2
30 PM terminal 1
32 PM terminal 2
34 PM terminal 3
36 PM terminal 4
38 STM terminal 1
40 STM terminal 2
42 conductor 1
44 conductor 2
46 conductor 3
48 conductor 4
50 rectifier/isolator
52 voltage regulator
54 current limiter and sensor
56 CPIM microcontroller
58 dc power communications system
60 switch matrix
62 conductor 5
64 conductor 6
66 general conductor 7
68 conductor 8
70 conductor 9
72 conductor 10
74 conductor 11
76 conductor 12
78 conductor 13
80 conductor 14
82 conductor 15
84 conductor 16
86 positive and negative lead bus conductor 17

88 conductor bus
90 power cell
92 sense resistor
94 charge/discharge switch position A open
96 charge/discharge switch position AB closed
98 series/parallel configuration switch 1 position A open
100 series/parallel configuration switch 1 position AB closed
102 series/parallel configuration switch 2 position A open
104 series/parallel configuration switch 2 position AB closed
106 series/parallel configuration switch 2 position AC closed
108 protection and monitoring system
110 PM microcontroller
112 bi-directional communications system
114 conductor 18
116 conductor 19
118 conductor 20
120 conductor 21
122 conductor 22
124 conductor 23
126 conductor 24
128 conductor 25
130 conductor 26
132 conductor 27
134 conductor 28
136 conductor 29
138 conductor 30
140 conductor 31
142 conductor 32
144 conductor 33
146 conductor 34
148 system termination module continuity connection
150 PM bi-directional communications connector

DETAILED DESCRIPTION

FIGS. 1-4

Figure 2:
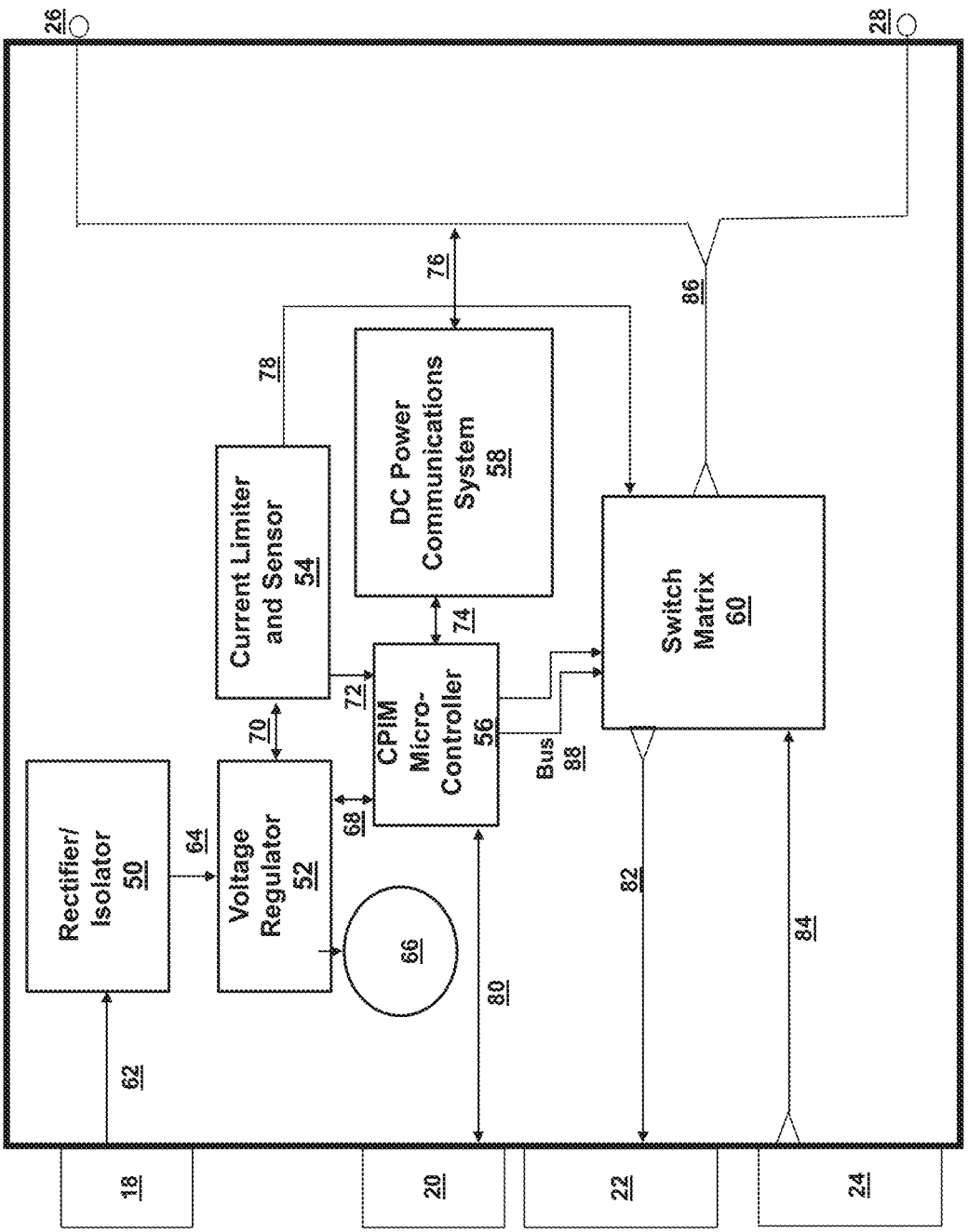
FIG. 2 is a detailed rendition of the major operational components comprising the CPIM.
Figure 3:
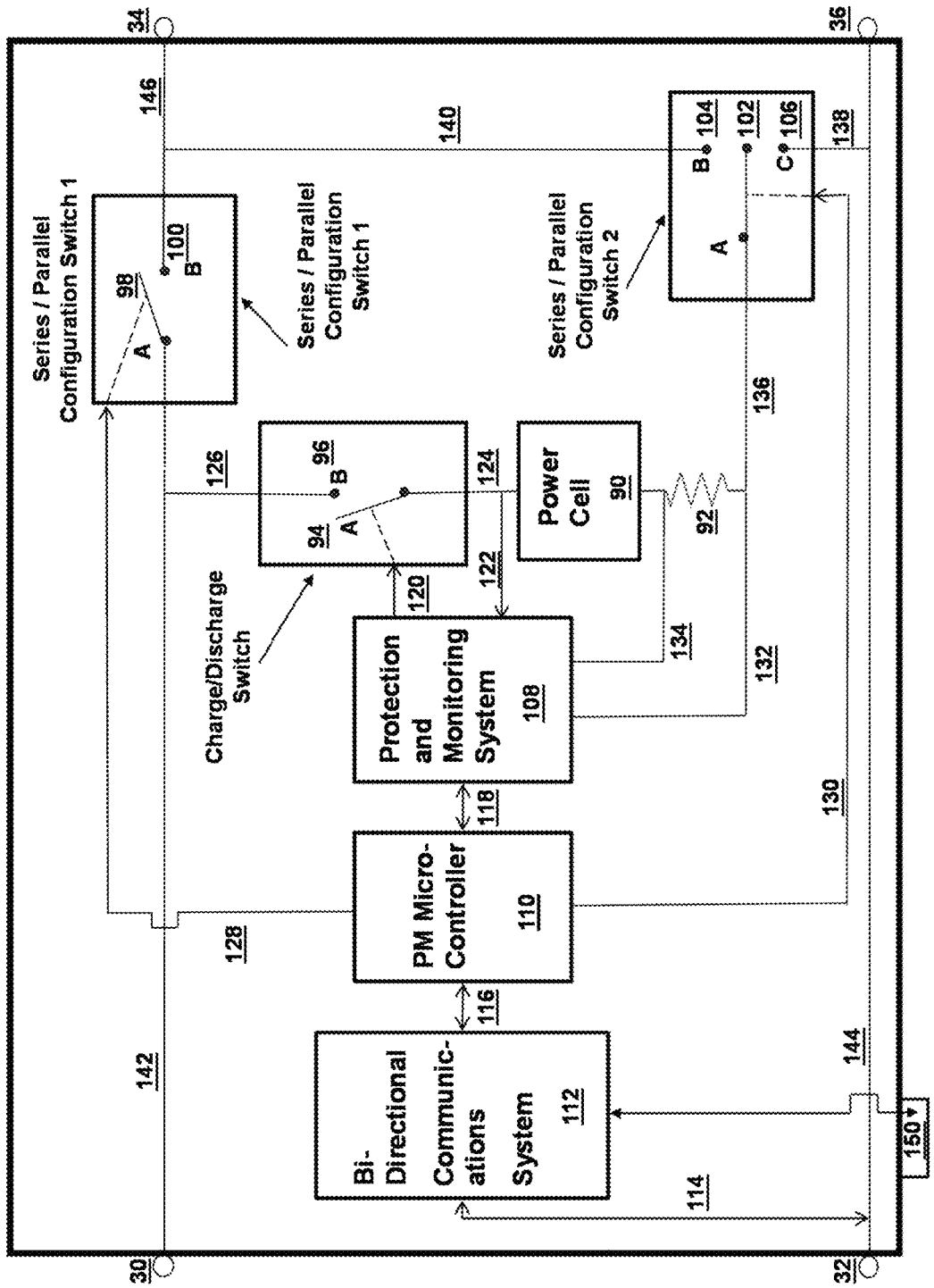
FIG. 3 illustrates the components comprising a PM.
Figure 4:
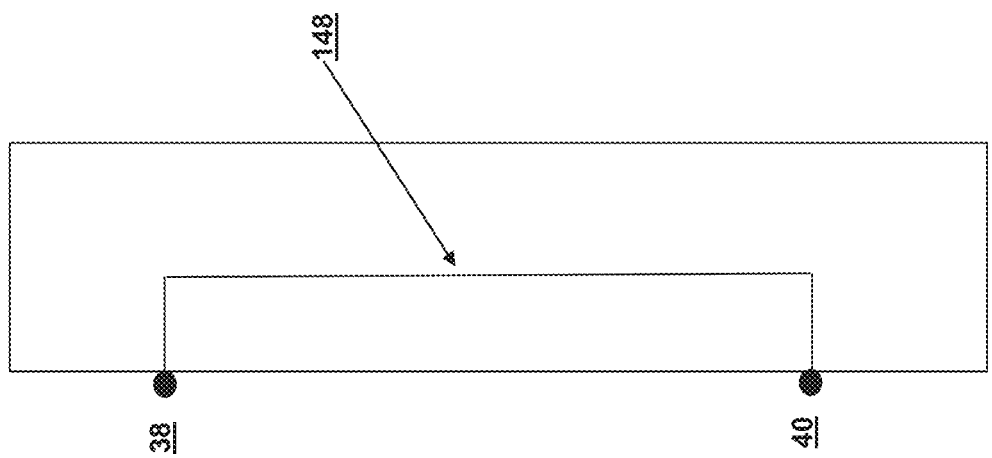
FIG. 4 shows the STM with its functional system.

The Self-Configuring Modular Electrical System (SCMES) 10 as illustrated in FIG. 1 and further internally detailed in FIGS. 2-4, consists on a major component level of a Communications/Power Interface Module (CPIM) 12, a Power Module (PM) 14 or any number of additional PM's 2-n 15 and a System Termination Module (STM) 16.

SCMES 10 interfaces with the 'outside world' via power-in connector 18, bi-directional communications connector 20, output power connector 22, cascade input connector 24 and PM bi-directional communications connector 150.

In FIG. 2 the CPIM 12 is the 'front end brain' of the entire SCMES 10, which functions in concert with the individualized localized cell control resident in each PM 14, requiring only two interconnect wires with each PM 14, and as such accommodates input for providing charging power, configuration interface setup, discharge management and unlimited cascading of other PM's 2-n 15 to each other for meeting any required power or current application. Internal to the CPIM 12 is a rectifier/isolator 50 which interfaces to power-in connector 18 via conductor 5 62 and subsequently voltage regulator 52 via conductor 6 64. Voltage regulator 52 interfaces to a current limiter and sensor 54 via conductor 9 70, CPIM microcontroller 56 via conductor 8 68 and all active components within CPIM 12 to provide bus power to them via general conductor 7 66. CPIM microcontroller 56 also interfaces to bi-directional communications connector 20 via conductor 14 80, dc power communication system 58 via conductor 11 74 and switch matrix 60 via conductor bus 88 consisting of a distinct positive and negative lead. Current limiter and sensor 54 also interfaces CPIM microcontroller 56 via conductor 10 72. Switch matrix 60 additionally interfaces to output power connecter 22 via conductor 15 82, cascade input connector 24 via conductor 16 84, CPIM terminal 1 26 via positive and negative lead bus conductor 17 86 and also CPIM terminal 2 28 via positive and negative lead bus conductor 17 86. DC power communications system 58 also selectively interfaces to CPIM terminal 1 26 and CPIM terminal 2 28 via positive and negative lead bus conductor 17 86.

FIG. 3 illustrates the internal components necessary for the PM 14 to function as detailed in this invention, and is comprised of PM terminal 1 30 which directly interfaces with series/parallel configuration switch 1 position A open 98 or series/parallel configuration switch 1 position AB closed 100 via conductor 32 142 and subsequently provides output to PM terminal 3 34 via conductor 34 146 while also interfacing with series/parallel configuration switch position AB closed 104 via conductor 31 140. Internal and at the heart of the system is power cell 90 which interfaces with charge/discharge switch position A open 94 or charge/discharge switch position AB closed 96 which interfaces to conductor 32 142. Power cell 90 additionally interfaces with sense resistor 92 which is monitored for voltage/current by protection and monitoring system 108 via conductor 27 132 and conductor 28 134. The protection and monitoring system 108 additionally receives status from the output of power cell 90 via conductor 22 122 communicating with conductor 23 124, and also protection and monitoring system 108 also communicates with charge/discharge switch position A open 94 or charge/discharge switch position AB closed 96 via conductor 21 120. The output of sense resistor 92 also goes to series/parallel configuration switch 2 position A open 102, series/parallel configuration switch 2 position AB closed 104 or series/parallel configuration switch 2 position AC closed 106. Series/parallel configuration switch 2 position AC closed 106 then connects to conductor 33 144 via conductor 30 138, which subsequently connects directly to bi-directional communications system 112 via conductor 18 114, and also PM terminal 2 32 and PM terminal connector 36. Bi-directional communication system 112 interfaces with PM microcontroller 110 via conductor 19 116, while PM microcontroller 110 interfaces with protection and monitoring system 108 via conductor 20 118 and also series/parallel configuration switch 1 position A open 98 or series/parallel configuration switch 1 position AB closed 100 via conductor 25 128, and also series/parallel configuration switch 2 position A open 102, series/parallel configuration switch 2 position AB closed 104 and series/parallel configuration switch 2 position AC closed 106, while resultant output of protection and monitoring system 108 communicates with charge/discharge switch position A open 94 or charge/discharge switch position AB closed 96 via conductor 21 120. PM 14 bi-directional communications connector 150 enables external bi-directional communications access between any PM 14 or CPIM 12 in any configuration, including a cascaded array of SCMES 10 via CPIM 12 bi-directional communications connector 20.

FIG. 4 depicts the STM 16 which is comprised of STM terminal 1 38, STM terminal 2 40, STM continuity connection 148.

Operation—FIGS. 1-4

The description above clearly illustrates the simple and elegant architecture that is a significant improvement over all existing matrix like power switching systems for managing an array of battery cells. Self-Configuring Modular Electrical System (SCMES) 10 as illustrated in FIG. 1 and further internally detailed in FIGS. 2-4 is a self-contained and self-protecting cell charging, balancing, control and communications system comprised of a Communications/Power Interface Module (CPIM) 12, a Power Module (PM) 14 or any number of additional PM's 2-n 15 and a System Termination Module (STM) 16. SCMES 10 receives external battery charging power via power-in connector 18, internal system monitoring is achieved via a Graphical User Interface (GUI) or other monitoring means via bi-directional communications connector 20, an output power connector 22 interfaces with the external device requiring power or another SCMES 10 to increase final output power by cascading an unlimited numbers of SCMES 10 via cascade input connector 24, and additional external bi-directional communications throughout SCMES 10 is made possible from any PM bi-directional communications connector 150. CPIM 12 is described pictorially in detail to illustrate how it is the controlling portion of SCMES 10, and also serves as the system entry point to receive external inputs for providing charging power, management for system interface setup, discharge management and unlimited cascading of other PM's 2-n 15 to each other for meeting any required power or current application. Internal to the CPIM 12 is a rectifier/isolator 50 making it possible for practically any AC or DC source to be interfaced with the unit, thus expanding the possibilities for utilizing practically any charging source which interfaces to power-in connector 18 via conductor 5 62 and subsequently employing voltage regulator 52 via conductor 6 64. Voltage regulator 52 also interfaces to a current limiter and sensor 54 via conductor 9 70 and thus completes the entire front-end input methodology for the system to take in any combination of external voltage sources for direct battery cell charging or cascading of SCMES 10. Additionally, CPIM microcontroller 56 interfaces with voltage regulator 52 via conductor 8 68 and all active components within CPIM 12 to provide all required bus power to all the active components within CPIM 12 via general conductor 7 66. CPIM microcontroller 56 also interfaces to bi-directional communications connector 20 via conductor 14 80, dc power communication system 58 via conductor 11 74 and switch matrix 60 via conductor bus 88 consisting of a distinct positive and negative lead. Current limiter and sensor 54 also interfaces CPIM microcontroller 56 via conductor 10 72. Switch matrix 60 additionally interfaces to output power connecter 22 via conductor 15 82, cascade input connector 24 via conductor 16 84, CPIM terminal 1 26 via positive and negative lead bus conductor 17 86 and also CPIM terminal 2 28 via positive and negative lead bus conductor 17 86. DC power communications system 58 also selectively interfaces to CPIM terminal 1 26 and CPIM terminal 2 28 via positive and negative lead bus conductor 17 86, and together as a system serves to setup and configure all inputs coming into SCMES 10 for configuring a single PM 14 or any successive number of PM's 2-n. PM 14 functions in a distributed building block design method, and is comprised of PM terminal 1 30 that directly interfaces with series/parallel configuration switch 1 position A open 98 or series/parallel configuration switch 1 position AB closed 100 via conductor 32 142 to subsequently provides output to PM terminal 3 34 via conductor 34 146 while also interfacing with series/parallel configuration switch position AB closed 104 via conductor 31 140. Charging is accomplished with all PM's configured in parallel, and discharge occurs when all PM's are arranged in series. Internal and at the heart of the system is power cell 90 which interfaces with charge/discharge switch position A open 94 or charge/discharge switch position AB closed 96 which interfaces to conductor 32 142. Power cell 90 additionally interfaces with sense resistor 92 whose voltage and levels are measured and current levels subsequently derived by protection and monitoring system 108 via conductor 27 132 and conductor 28 134. The protection and monitoring system 108 continually receives status from the output of power cell 90 via conductor 22 122 communicating with conductor 23 124, and also protection and monitoring system 108 while communicating with charge/discharge switch position A open 94 or charge/discharge switch position AB closed 96 via conductor 21 120. The output of sense resistor 92 also goes to series/parallel configuration switch 2 position A open 102, series/parallel configuration switch 2 position AB closed 104 or series/parallel configuration switch 2 position AC closed 106. Series/parallel configuration switch 2 position AC closed 106 then connects to conductor 33 144 via conductor 30 138, which subsequently connects directly to bi-directional communications system 112 via conductor 18 114, and also PM terminal 2 32 and PM terminal connector 36. Bi-directional communication system 112 interfaces with PM microcontroller 110 via conductor 19 116, while PM microcontroller 110 interfaces with protection and monitoring system 108 via conductor 20 118 and also series/parallel configuration switch 1 position A open 98 or series/parallel configuration switch 1 position AB closed 100 via conductor 25 128, and also series/parallel configuration switch 2 position A open 102, series/parallel configuration switch 2 position AB closed 104 and series/parallel configuration switch 2 position AC closed 106, while resultant output of protection and monitoring system 108 communicates with charge/discharge switch position A open 94 or charge/discharge switch position AB closed 96 via conductor 21 120. PM 14 bi-directional communications connector 150 enables external bi-directional communications access between any PM 14 or CPIM 12 in any configuration, including a cascaded array of SCMES 10 via CPIM 12 bi-directional communications connector 20. At the end of the system is STM 16 comprised of STM terminal 1 38, STM terminal 2 40 and STM continuity connection 148, together serving as the continuity return path for all power and data for SCMES 10.

Charging or discharging of SCMES 10 in a parallel state is achieved by configuring series/parallel configuration switch 1 position AB closed 100, series/parallel configuration switch 2 position AC closed 106 and charge/discharge switch position AB closed 96, with this scheme being repeated by all PM's 2-n 15 with the PM 14 adjacent to STM 16 having series/parallel configuration switch 1 position A open 98. To bypass a PM 14, the overall switch configurations are to have series/parallel configuration switch 1 position AB closed 100, series/parallel configuration switch 2 position AC closed 106 and charge/discharge switch position A open 94.

Discharging of SCMES 10 in a series state is achieved by configuring series/parallel configuration switch 1 position A open 98, series/parallel configuration switch 2 position AB closed 104 and charge/discharge switch position AB closed 96, with this scheme being repeated by all PM's 2-n 15. To bypass a PM 14, the overall switch configurations are to have series/parallel configuration switch 1 position AB closed 100, series/parallel configuration switch 2 position AC closed 106 and charge/discharge switch position A open 94.

Advantages

In accordance with the detailed informative description above, the following qualities are additionally provided to further illustrate the importance and virtues of this invention:

1) The architecture of this invention is totally independent of any baseline series or parallel configuration while being wholly configured internally and autonomously based upon mission requirements, and can also internally autonomously reconfigure on a power module level in the event of any instantaneous failure to flawlessly continue the mission.

2) The easily integrated capability of this invention lends itself to being expandable or shrunk to any size without adding any wiring or switching complexity to meet a customer's requirements without any follow-on engineering necessary.

3) Circuitry inherent within the battery system compensates for any short circuits, under voltage or over charge circumstances, regardless of its internal series or parallel configured internal state.

4) Any arrangement of the distributed or fractionated system functions as a whole system while being functionally undetectable as being broken into any number of components, with each component having autonomous internal control over the series/parallel configuration of its particular internal battery cells.

5) The modular approach to this system being that of an individually robust assemblage of individually controlled cellular components which can reconfigure themselves autonomously and substitute in a spare cell for an ailing one is of key importance to operational requirements.

6) The integrated single or distributed package comprising this system can function in any typical aerospace or ground scenario while being fully capable of providing the most efficient method of enabling power to be available anywhere needed in the most reliable, simple and elegant way possible.

7) The advanced capabilities of this invention far supersede any existing technology when it comes to operations or maintenance due to its ability to recover/reconfigure itself into a robust state after an internal failure happens with absolute minimal peripheral wiring or switching, and dramatically increases the fault-tolerance capability when compared to anything else available.

8) The capability to internally reconfigure itself to instantly compensate for any one cell's catastrophic failure is key to uninterrupted mission success and safety.

9) With 100% secondary battery redundancy no longer required, the size/weight footprint of this invention has now effectively been cut in half when compared to even the most advanced systems available, all due the internal autonomous reconfiguring capability now possible with this invention.

10) A further demonstration of how robust and reconfigurable this system is made apparent is via the integrated design that has no limitations on the amount of capability that can be integrated within its original small footprint in size and weight.

11) Hybrid combinations of external recharging sources are easily integrated into this system to maintain a full instant capability which fulfils the most stringent of operational requirements in an easy manner.

12) The autonomous internal reconfiguration from series to parallel or parallel to series instantly allows for a stabilized power output that has no degrading effect upon safety or mission success schedules or timelines.

13) Regardless if a battery's internal cell structure is arranged autonomously in a series or parallel configuration, data can be gathered from it for analysis and storage for further analysis.

14) In addition to a standard graphical user interface displaying basic parameters, this invention takes advantage of the autonomous smart electronics integral with the system to further extrapolate data and internal configuration longevity predictive performance scenarios to further enhance the battery cell health for optimal employment.

15) The notably reduced size and weight of this invention when compared to its predecessors allows for its functionality to be introduced internally into other systems aboard a vehicle where other power/battery systems would never fit, and if they could, their reliability would be much less and much more complex when compared to those systems it would be integrated into.

16) The uniquely designed modular and scalable architecture provides for a real-time feedback and monitoring of all individual cell voltages, no matter whether if they are in a series, parallel or bypassed arrangement.

17) The autonomous series/parallel reconfiguration capability for discharge/charging inherent in this invention is equally robust to environmental considerations as are the batteries/cells themselves, and enables its use in practically any launch, flight or orbit circumstance.

18) In addition to each power module being uniquely addressable from an external input or monitoring device, it also functions internally and autonomously to achieve the same desired configuration while being capable of overriding if desired by an operator.

19) Full battery conditioning and cell balancing is possible at any time when the system is configured parallel state as required by mission parameters, and full discharge is capable when the system is configured in series.

CONCLUSION, RAMIFICATIONS AND SCOPE

The reader can easily discern the advanced and optimized features of this invention which baselines a decentralized battery management systems approach in sharp contrast to the inefficiencies involved with existing centralized architectures. Giving individual components comprising the system their own autonomous command authority completely breaks with the traditional paradigm of past battery/power systems where complex wiring and switching matrices complicated simplicity, reliability, compactness and versatility. In the size-weight and reliability intensive high-end applications such as those required in the aerospace industry, no other battery/power system is comparable to the attributes exhibited herein whereby simplicity, ultimate safety, reliability, versatility and operability is achievable in any configuration desired for integration into any required operability footprint. In addition to the size and weight operational considerations made possible by this invention, cost considerations are also forefront whereby the simple and elegant integration of a 'spare tire' battery cell into the system now makes it possible to eliminate what was once a whole secondary backup battery which was needed to takeover should a primary battery fail due to the loss of a single cell within the primary battery, and thus effectively cut the cost in half of what was previously required to achieve the same level of reliability in the deployed system.

it can configure itself simply, elegantly and autonomously to meet any mission need, requiring that only the desired output capability be specified by the user.

it can be easily and elegantly reconfigured or scaled at any time into an new footprint to meet an changing operational needs.

it autonomously senses all on-board states of operability and when required autonomously reconfigures all internal components to achieve any new and changing requirements.

it can be fractionated into as many distributed components as desired with all components functioning together as one single unit, and is autonomously configurable.

it employs the most state of the art capability ever to afford an unmatched reliable battery and power system.

its robust, reliable nature is an industry leader for any air, land or sea employment, and completely does away with all present limitations demonstrated by existing battery/power systems which rely on a single controlling battery management systems connected in a matrix-like manner to complex and massive wiring.

it is the most robust and dynamic battery/power supply available in addition to being simpler to operate than any other battery system while taking up the smallest amount of space and weighing the least.

it affords unprecedented safety, reliability and mission success through its internal reconfiguration capability.

it can be integrated into the most demandingly small spaces where ventilation or heating may have been an issue.

the robustness of the internal reconfiguration capability of this invention is applicable in all aerospace vehicles from missiles and rockets to aircraft.

it has a built-in interface allowing for the connection of external power or other cascaded identical systems to selectively augment the inherent robust capability of this invention, while still maintaining all the important operational parameters necessary to insure the robustness, safety and reliability of the system.

it intelligently and autonomously reconfigures itself instantly during any mission phase internally to insure that a sustainable output of required voltage and current is always available to insure safety and mission success.

for the first time it will be possible to gather data real-time on a battery's performance down to the individual cell level in a distributed system, regardless of its series or parallel configuration.

it further leverages all state of the art technologies in the most advanced way possible to provide the most reliable power density in the smallest space with internal redundancy made possible by its internal autonomous configuring capability.

it fits within the footprint/size and weight of practically any ground or aerospace systems where energy density/rapid charge is of paramount importance.

it allows the user to have an instant understanding of the internal state of the power system at any time, whether in flight or on the ground.

the ability for this invention to reconfigure itself internally into a cell bypass state enables the rapid recovery of the battery in the event of an individual cell failure.

it can simply display the desired end-state configuration of the system internals, or it can give an operator access to override any series parallel configuration for test, measurement or operational purposes.

it enables the operationally required capability of stability and longevity in any state of internal autonomous series or parallel configuration.

Although this invention as detailed herein contains many focused specifications, these specifications should only be interpreted as being descriptive in nature and not limiting to the many adaptations and configurations made possible by the essence of this invention which is its internal autonomous reconfiguration capability, the ability for it to achieve the highest reliability ever demonstrated within a battery system via the 'spare tire' cell, and finally its ability to be employed in a distributed way in many locations and virtually configured as a 'networked' power system comprised of other identical systems which are then setup via a master control unit allows for any stacked voltage increase or higher current parallel derived output to be provided. Thus, the scope of this invention should be determined by the appended claims and their legal equivalents.

We claim:

1. A self configuring modular electrical system comprised of a communications and power interface module, a single autonomously controlled power module which also seamlessly interfaces with a plurality of identical autonomously controlled power modules, said ending power module communicating with a system termination module, said communications and power interface module being defined as having an input connection means for receiving a charging voltage, an output connection means to provide a total system output voltage, a connection means for supplying bi-directional communications into and out of said communications/power interface module, a connection means for cascading unlimited identical complete said modular and distributed power and communications systems together, and a connection means for interfacing with an input means on said power module, said power module comprised of an automated internal parallel-series configuration means which communicates with any number of identical said power modules to provide any desired charge, discharge, bypass state and output voltage combination via said output connection means interfacing said input means on any said power module, said power module additionally having a bi-directional connection means for interfacing with a bi-directional communication connection means and said system termination module, said termination module having a connection means for interfacing with said power modules with all interconnectivity between all said modules being accomplished a two wire means.

2. A self configuring modular electrical system of claim 1 whereby any number of said power modules can functionally contribute to an additive voltage or current for output via said output connection means while additionally accommodating spare said power modules which can be inactive until required to instantaneously and autonomously replace any said power module for any reason including failure.

3. A self configuring modular electrical system of claim 2 whereby said communications/power interface module, said power modules and said system termination module can be physically co-located or distributed over varying distances from each other.

4. A self configuring modular electrical system of claim 3 whereby any operational parameters of any said power module are discernable and monitorable via said connection means on said communications/power interface module, supplying bi-directional communications into and out of said communications/power interface module.

5. A self configuring modular electrical system of claim 4 whereby any internal failures are completely and autonomously addressed by said communications/power interface module or said power module with no external intervention required, while said communications/power interface module provides visibility to an external monitoring and override means.

6. A self configuring modular electrical system of claim 5 whereby said system is capable of providing external bi-directional data communication via radio frequency (RF) via said two wire means throughout said self configuring modular electrical system.

7. A self configuring modular electrical system of claim 6 whereby said communications/power interface module, said power modules and said system termination module are of a ruggedized form factor suitable for use in any aerospace environment including space launch, and orbital operations.

* * * * *